Jan. 27, 1970   W. E. KENNY   3,492,449
WATER ACTUATED CIRCUIT CLOSER
Filed May 17, 1968

INVENTOR
WILFRED E. KENNY
BY
Fetherstonhaugh & Co.
ATTORNEYS

United States Patent Office 3,492,449
Patented Jan. 27, 1970

3,492,449
WATER ACTUATED CIRCUIT CLOSER
Wilfred E. Kenny, 745 Tudor Ave., North Vancouver,
British Columbia, Canada
Filed May 17, 1968, Ser. No. 730,099
Int. Cl. H01h 29/02
U.S. Cl. 200—61.04                    3 Claims

ABSTRACT OF THE DISCLOSURE

A water actuated circuit closing device having conductors embedded, in spaced apart relationship, in an obsorbent, non-conductive, solid body, formed of ionic material which upon being moistened with water, forms an electrolyte so as to electrically connect the conductors.

BACKGROUND OF THE INVENTION

This invention relates to automatic circuit closing devices and particularly to devices for detecting and indicating the presence of leaks in water circulatory systems and the like.

Leaks which develop in water systems, for example, water systems employing hot water heating tanks, normally first appear as pin holes. The leakage is therefore not readily discernable and quite often passes unnoticed for a considerable period. In time, however, if the leak has been caused by corrosion of metal parts, these pin holes, due to water hammer or the like, enlarge and the leakage then becomes extensive and may, if not observed, create considerable damage or inconvenience.

Indicating devices employing water operated circuit closers have heretofore been designed to give warning of small leaks so that the parts of the water system in which they occur can be repaired or replaced immediately. These circuit closers of prior design have, in the main, not been accepted readily as they have usually been relatively costly to install and maintain. Furthermore, such circuit closers of prior art have been so constructed as to usually have exposed metal parts which create a safety hazard and therefore, require careful installation in order to safeguard against electrical short circuits and the like.

SUMMARY OF THE INVENTION

The present invention provides a water actuated circuit closing device and a method of construction thereof which overcomes the objectionable features of similar circuit closers of prior art.

The circuit closing device of the present invention may not only be produced cheaply but may be installed by the average householder having very little knowledge of electrical appliances. The circuit closing device of the present invention, furthermore, is so constructed as to avoid the exposure of electrically energized metal contact parts and therefore eliminates, or greatly reduces, the risks and hazards associated with the use of such devices in water systems employing metallic parts.

The circuit closing device of the present invention comprises conductors embedded, in spaced apart relationship, in an absorbent, solid body formed of a non-conductive, ionic material which, when moistened with water, will form an electrolyte so as to electrically connect the conductors. The ionic material is preferably a gypsum product which is only very slightly soluble in water and which can first be prepared in plastic form, placed in a mold and the conductors embedded therein and maintained in spaced apart relationship until the gypsum product has set to a solid, absorbent body of rock-like consistency.

DESCRIPTION OF THE PREFERRED EMBODIMENT

Figure 1:
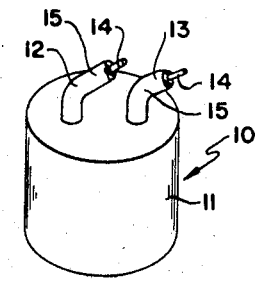
FIGURE 1 is an isometric view of the circuit closing device.
Figure 2:
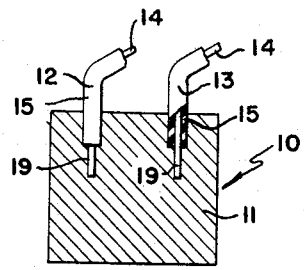
FIGURE 2 is a central sectional view of the device.

Referring to the drawings and particularly FIGURES 1 and 2 thereof the circuit closing device accorded to the general numeral 10 comprises an absorbent, non-conductive, solid body 11 formed of an ionic material within which a pair of insulated conductors 12 and 13 are embedded in spaced apart relationship.

The solid body 11 is formed of a setable material preferably a gypsum product such as Plaster of Paris or dental stone which, when mixed with water, will set to a rock-like consistency yet which will absorb water quite readily.

The conductors 12 and 13 are of conventional manufacture having a central copper conductive core 14 covered by an insulating material 15. Each of the conductors is prepared by removing the insulative covering from the ends of the conductor so as to provide a pair of bare core portions 19. The conductors 12 and 13 are embedded in the body so that the latter completely encases the bare core portions 19 and a portion of the insulative cover 15 adjacent thereto.

In constructing the device 10 the conductors 12 and 13 are prepared as aforesaid and the gypsum product such as Plaster of Paris or dental stone mixed with water to a paste-like consistency. This mixture is then poured into a mold, not shown, of suitable dimension and the conductors 12 and 13 thrust into the mixture to a depth, as aforesaid, and maintained in spaced apart relationship until the mixture has set. The body 11, when set, attains a rock-like consistency, however, it is porous and thereby readily absorbs water. Gypsum or gypsum products such as Plaster of Paris or dental stone are ionic solids which, when dry, offer such high resistance that there will be no appreciable current flow between the conductors. Gypsum or gypsum products, however, are slightly soluble in water, and, when set, will form an electrolyte, when the body 11 absorbs water, thereby forming a conductive path between the conductors 12 and 13 and thereby permitting the flow of an electric current therebetween.

The ability of the body 11, when moistened with water, to carry an electric current may be enhanced if there is included therein, in minimal proportions, an ionic solid of a high degree of solubility. This latter solid may be a salt such as common salt (sodium chloride) which not only serves as an accelerator to speed the setting of the gypsum product but when mixed with the gypsum product to be set goes into solution and forms an homogenous mixture with the latter. The salt will, of course, form a strong electrolyte when the device is moistened with water and enhances the dependability of operation of the device 10.

Although the salt is spread throughout the body it is, when dry, so highly resistant to the passage of an electric current that it can be considered as being non-conductive.

Figure 3:
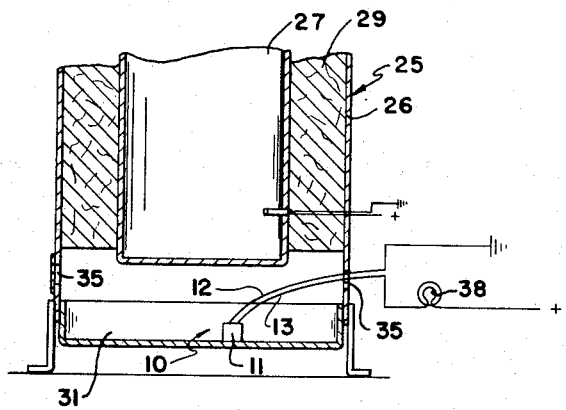
FIGURE 3 is a schematic view of a circuit including the device as installed in a water heater.

In FIGURE 3 there is illustrated the device 10 in association with a conventional type of hot water heater 25. The heater has an outer jacket 26 and an inner water tank 27 which is spaced from the jacket by insulative material 29. The jacket 26 extends below the tank 27 and, as is common with heaters of this type, is usually provided with a drip pan 31 spaced below the tank 27. As is common with this type of heater, the jacket 26 is usually provided with openings 35 which may be covered with removable panels for inspecting the heating components of the heater, whether it be gas or electrically operated.

The device 10 is simply placed on the drip pan 31 with the insulated conductors 12 and 13 extending through a suitable opening 35. If the heater is not provided with a drip the device 10 may be located in areas where water would most likely accumulate. The conductors are connected to the respective poles of a suitable source of electric power and in either one of them is included a visible or audible alarm device 38. As illustrated in FIGURE 3 it is preferred to place the alarm device 38 between device 10 and the live connection. It is preferred to use, for the alarm device, a lamp such as a glow lamp which requires very little current for its operation and which, therefore, prevents overloading of the device 10 and, consequently, eliminates hazards due to short circuits and the like.

It will be understood that although in FIGURE 3 only one device 10 is shown, a number of such devices may be connected in parallel with each other and in association with one alarm device and positioned at varied locations in any water circulation system to detect leaks therefrom. It is to be further understood that the device 10 has been illustrated and described in its most simple form. For instance, although the conductors 12 and 13, as illustrated, simply extend into the body 11 parallel to each other conductors, similar to conductors 12 and 13, may be arranged in any manner desired, e.g., concentrically. Furthermore, the body 11, although illustrated as taking the form of a short cylinder may be of any shape desired.

The device 10, besides being very inexpensive to produce and easy to install, is highly dependable in its operation. In the first place, the body 11 being formed primarily of a gypsum product is not particularly soluble in water and therefore withstands repeated soakings without disintegrating. Furthermore, the bared portions 19 of the conductive cores of the insulators are in intimate contact with the ionic material forming the body 11 so as to be in full contact with the electrolyte formed when the body absorbs moisture.

What is claimed is:

1. A water actuating circuit closing device including conductors embedded in spaced apart relationship in an absorbent solid body formed of a material including a water soluble gypsum product, the said product being absorbent when moistened with water, thus forming an electrolyte so as electrically to connect the conductors.

2. A device as claimed in claim 1, wherein the material forming the solid body is a homogenous mixture of a gypsum product and an ionic non-conductive salt providing a high degree of solubility, the said ionic salt being a minimal part of said mixtures.

3. A device as claimed in claim 2 wherein the ionic salt is common salt.

References Cited

UNITED STATES PATENTS 3,200,388    8/1965    Uhlig            200—61.04
3,255,324    6/1966    Ovshinsky      200—61.04

HERMAN O. JONES, Primary Examiner